L. C. ROSE.
HEADLIGHT FOR MOTOR DRIVEN VEHICLES.
APPLICATION FILED OCT. 29, 1913.
1,124,810.
Patented Jan. 12, 1915.
2 SHEETS—SHEET 1.
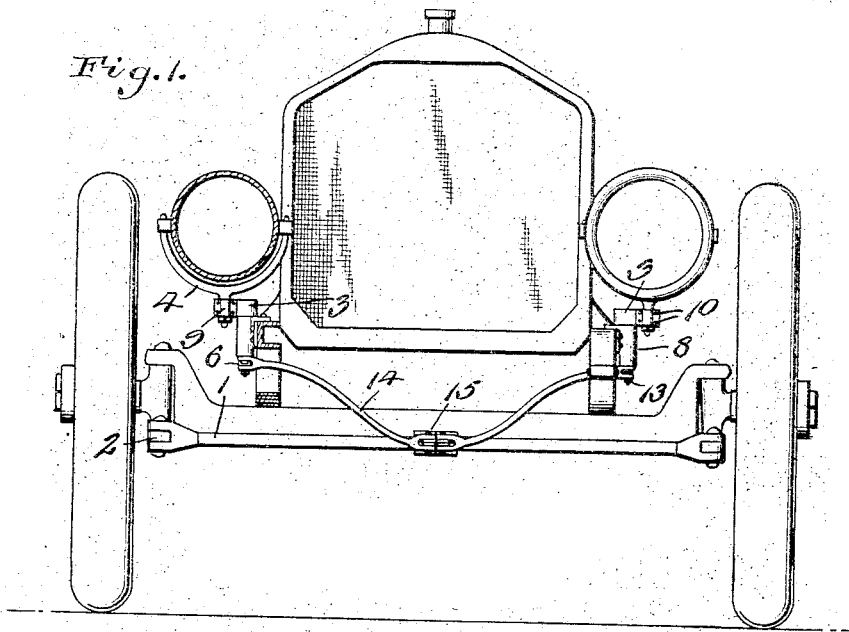
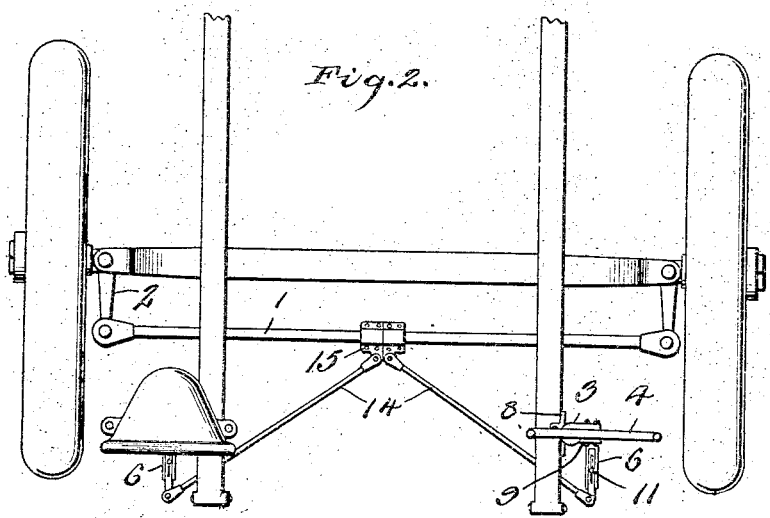
Witnesses
Inventor
L. C. Rose,
By Victor J. Evans
Attorney

L. C. ROSE
HEADLIGHT FOR MOTOR DRIVEN VEHICLES.
APPLICATION FILED OCT. 29, 1913.

1,124,810.

Patented Jan. 12, 1915.
2 SHEETS—SHEET 2.

Witnesses
R. Anderson Jr.
V. B. Hillyard.

Inventor
L. C. Rose,
By Victor J. Evans
Attorney

UNITED STATES PATENT OFFICE.

LEON C. ROSE, OF ONEONTA, NEW YORK.

HEADLIGHT FOR MOTOR-DRIVEN VEHICLES.

1,124,810.  Specification of Letters Patent.  Patented Jan. 12, 1915.

Application filed October 29, 1913. Serial No. 798,067.

*To all whom it may concern:*

Be it known that I, LEON C. ROSE, a citizen of the United States, residing at Oneonta, in the county of Otsego and State of New York, have invented new and useful Improvements in Headlights for Motor-Driven Vehicles, of which the following is a specification.

The invention relates primarily to a headlight of the dirigible type designed chiefly for use in connection with motor vehicles so as to operate automatically with the steering mechanism for throwing the rays of light in advance of the machine when the same is traveling straight ahead, turning a corner or rounding a curve.

The invention provides a headlight of the nature hereinbefore stated which may be readily applied to any make or type of automobile or kindred motor vehicle so as to operate with the steering mechanism and to insure the beams of light being thrown in the path of the vehicle under all conditions thereby preventing a fatality which would otherwise be liable to occur when turning from a straight course after dark.

The invention provides novel mountings for the lamp supports whereby the same are permitted to turn and novel connecting means between such connections and drag link or rod generally provided for connecting the arms of the steering knuckles whether such drag link is located in front or in the rear of the axle.

The invention consists of the novel features, details of construction and combination of parts, which hereinafter will be more particularly set forth, illustrated in the accompanying drawing, and pointed out in the appended claim.

Figure 3:
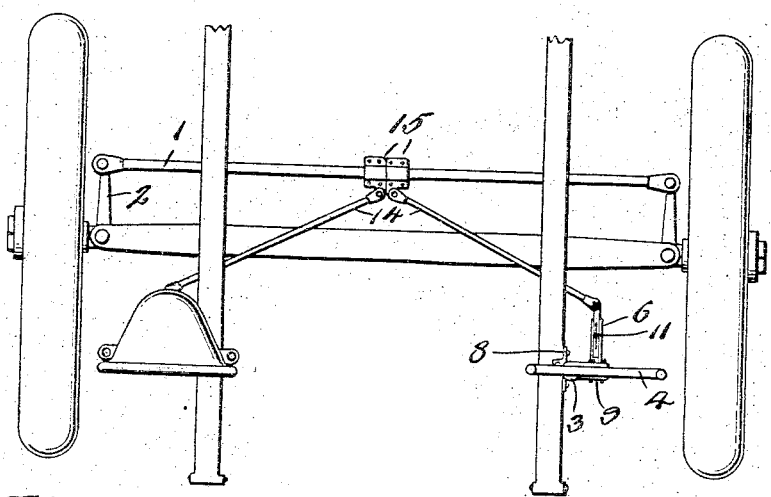
Figure 4:
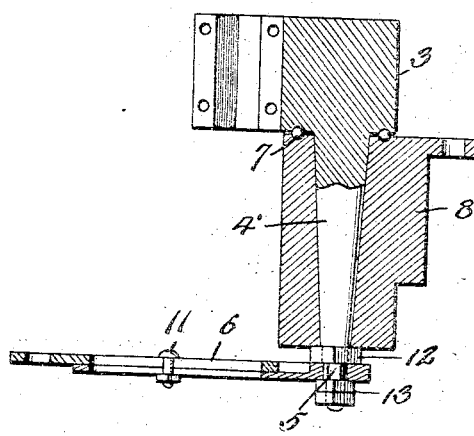
Figure 5:
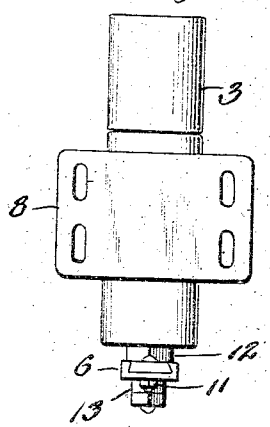
Figure 6:
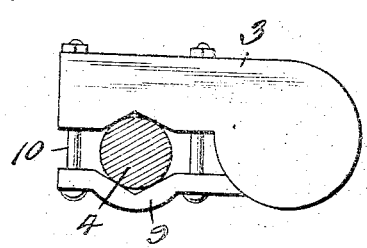

Referring to the drawing, forming a part of the specification, Figure 1 is a front view of an automobile provided with head lamps embodying the invention. Fig. 2 is a top plan view of the front portion of the chassis showing the relation of the coördinate parts. Fig. 3 is a view similar to Fig. 2 showing the applicatiton of the invention when the drag link or rod connecting the arms of the the application of the invention when the axle. Fig. 4 is a sectional detail showing the means for connecting the lamp support to the frame of the machine in a manner to admit of the lamp turning. Fig. 5 is a side view of the parts shown in Fig. 4. Fig. 6 is a top plan view of the part designed to receive the lamp support. Fig. 7 is a detail view of the adjustable connection forming part of the connecting means between a lamp support and the drag link or connecting rod.

Corresponding and like parts are referred to in the following description, and indicated in all the views of the drawing, by the same reference characters.

The numeral 1 designates the drag link or rod connecting the arms 2 extending from the steering knuckles of an automobile or analogous motor vehicle. This drag link or connecting rod may be located either in the front or in the rear of the axle as indicated most clearly in Figs. 2 and 3. A bracket 3 is constructed to receive the shank or stem of the usual fork or lamp support 4. This bracket 3 comprises a head and a stem 4' the latter being preferably tapered and provided at its lower end with a polygonal or noncircular portion 5 with which an arm 6 connects so as to prevent relative turning of the bracket and arm. Balls 7 are interposed between the head of the bracket 3 and a bearing 8 which is adapted to be secured to a suitable part of the machine frame so as to facilitate the turning of the bracket and thereby offer a minimum resistance to the movement of the steering and lamp mechanisms. The stem of the lamp fork or support 4 is adapted to be clamped to the head of the bracket 3 and for this purpose a plate 9 is adapted to be secured to a side of the bracket head by means of bolts 10 or like fastenings. The gripping faces of the parts clamping the shank of the lamp support are recessed to insure a firm gripping action. It is to be understood that the lamp support fork may be secured to the bracket 3 in any manner. The bearing 8 has a vertical opening to receive the shank 4' of the bracket 3 and is also formed with flanges which are apertured to receive fastening means whereby the bearing is attached to a bar or other convenient part of the frame of the machine. The provision of the bearing 8 enables the invention to be applied to various makes of motor driven vehicles and also provides convenient means for receiving the bracket 3 and supporting such bracket in a manner to turn freely which is essential.

The arm 6 is preferably constructed in a manner to be lengthened or shortened thereby admitting of readily adapting the invention to the different makes of machines so as to obtain the best results. As indicated most clearly in Fig. 7 the arm 6 is composed of sliding sections or parts which are longitudinally slotted and then held in the adjusted position by means of the fastening 11. The lower end of the shank 4' of the bracket 3 is threaded both above and below the polygonal portion 5 so as to receive nuts 12 and 13 between which the arm 6 is secured. The nut 12 engages the lower end of the bearing 8 and prevents vertical movement of the bracket 3. The lower nut 13 may be secured in any manner as by means of a jam nut.

A rod 14 connects the outer end of the arm 6 with the clamp 15 secured to the drag link or connecting rod 1. The ends of the rods 14 are pivotally connected to the respective parts to permit of a pivotal movement between them so as to avoid binding. The ends of the rods 14 are forked so as to embrace the parts to which they are pivotally connected thereby equalizing the strain upon the pivot fastenings.

When adapting the invention to the head lamps of a motor vehicle the lamp supports are disconnected from the frame of the machine and are secured to the brackets 3, and the bearings 8 are attached to the side bars or other convenient part of the frame of the machine in the most advantageous position. The clamps 15 are connected to the arms 6 by means of the rods 14 it being understood that the length of the arms 6 is adjusted to insure proper turning of the head lamps when the steering wheels of the machine are moved so as to cause the light to be thrown in advance of the machine when going in a straight course, turning a corner or rounding a curve.

It will be understood from the foregoing taken in connection with the accompanying drawings that the invention is of such a nature as to admit of any machine being readily equipped with a headlight which is automatic in operation to throw the light in the path of the machine under all conditions thereby lighting up the roadway to such an extent as to enable the driver to avoid collision or the running into a ditch or other depression or obstruction.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In a movable headlight for vehicles, the combination of a lamp support having a stem, a bracket comprising a head and stem, a plate secured to a side of the head of the bracket and serving to clamp the stem of the lamp support to such head, a bearing having the stem of the bracket journaled therein, an arm fitted to the lower end of the stem of the bracket, means for securing such arm to the stem and holding the latter in the bracket, and operating means connected with said arm.

In testimony whereof I affix my signature in presence of two witnesses.

LEON C. ROSE.

Witnesses:
JOHN P. BRISTOL,
ROBERT HALL.